(12) United States Patent
Darby

(10) Patent No.: US 9,777,987 B2
(45) Date of Patent: Oct. 3, 2017

(54) CLAMPING RETENTION CLIP

(71) Applicant: Randall Lynn Darby, Chicago, IL (US)

(72) Inventor: Randall Lynn Darby, Chicago, IL (US)

(*) Notice: Subject to any disclaimer, the term of this patent is extended or adjusted under 35 U.S.C. 154(b) by 0 days.

(21) Appl. No.: 15/234,452

(22) Filed: Aug. 11, 2016

(65) Prior Publication Data

US 2016/0349008 A1    Dec. 1, 2016

Related U.S. Application Data

(63) Continuation-in-part of application No. 14/919,721, filed on Oct. 21, 2015, now abandoned.

(60) Provisional application No. 62/073,956, filed on Nov. 1, 2014.

(51) Int. Cl.
| | |
|---|---|
| *F41C 33/04* | (2006.01) |
| *A45C 13/10* | (2006.01) |
| *A45F 5/02* | (2006.01) |
| *F16B 2/10* | (2006.01) |

(52) U.S. Cl.
CPC ........ *F41C 33/041* (2013.01); *A45C 13/1076* (2013.01); *A45F 5/02* (2013.01); *F16B 2/10* (2013.01); *A45F 2200/0591* (2013.01); *Y10T 24/44709* (2015.01)

(58) Field of Classification Search
CPC ......... Y10T 24/44513; Y10T 24/44521; Y10T 24/44641; Y10T 24/4465; Y10T 24/44692; Y10T 24/44709; Y10T 24/44718; Y10T 24/44769; Y10T 24/44778; Y10T 24/4488; Y10T 24/44966; A45F 2200/0591; A45F 5/02; A45C 13/1076; F41C 33/041
See application file for complete search history.

(56) References Cited

U.S. PATENT DOCUMENTS

| | | |
|---|---|---|
| 422,906 A | 3/1890 | Booth |
| 748,423 A | 12/1903 | Schaffner |
| 778,780 A | 12/1904 | Guttman |
| 1,297,456 A | 3/1919 | Frey |
| 3,101,185 A | 8/1963 | Gustafson |

*Primary Examiner* — Robert J Sandy
*Assistant Examiner* — Michael Lee
(74) *Attorney, Agent, or Firm* — Edward R. Ergenzinger

(57) ABSTRACT

A two part clamping retention clip is provided comprising a mounting area for attachment to a holster, bag, pouch or other device and a clamping head with adjacent flap for reversible and secure engagement to a material worn by the user.

7 Claims, 3 Drawing Sheets

CLAMPING RETENTION CLIP

CROSS-REFERENCE TO RELATED APPLICATIONS

This application is a continuation-in-part of U.S. application Ser. No. 14/919,721 filed on Oct. 21, 2015 which claims the benefit of U.S. Provisional Application No. 62/073,956, filed Nov. 1, 2014; each of which are incorporated herein by reference in their entireties.

FIELD OF THE INVENTION

The present invention primarily relates to firearm holsters, but is not entirely limited to firearm holsters and can be adapted and used on a variety of pouches, bags and/or sheaths.

BACKGROUND OF THE INVENTION

Holsters are used to carry many different items, including hand-held firearms. Hand-held firearms, also known as pistols, for the most part are carried in some type of holster. Holsters are primarily used to help conceal a firearm, and provide retention so that the pistol remains in a certain location. Most holsters rely on a U-shaped metal or plastic clip to secure the holster in the place that a person desires to carry or store the pistol. A problem with traditional holsters clips is that they tended to be viewable therefore affecting the ability to be discreetly concealed. Another problem with traditional U-shaped metal or plastic clips is that they do not implore leverage and pressure as a way to retain the clip and holster in the desired location and/or position. A main concern when removing a pistol from its holster is if the holster clip has enough retention to maintain its affixed location. If the clip detaches, it would virtually render the pistol unusable in the event of a life threating situation. Presently there is no solution for better holster retention while at the same time providing better concealability.

SUMMARY OF THE INVENTION

The present invention seeks to provide a solution to the problems by providing a more discreet way to secure a firearm holster as well as providing a greater level of retention for holsters, bags, pouches and other items and devices which are desirable to be securely held about a person.

DETAILED DESCRIPTION OF THE INVENTION

Figure 1:
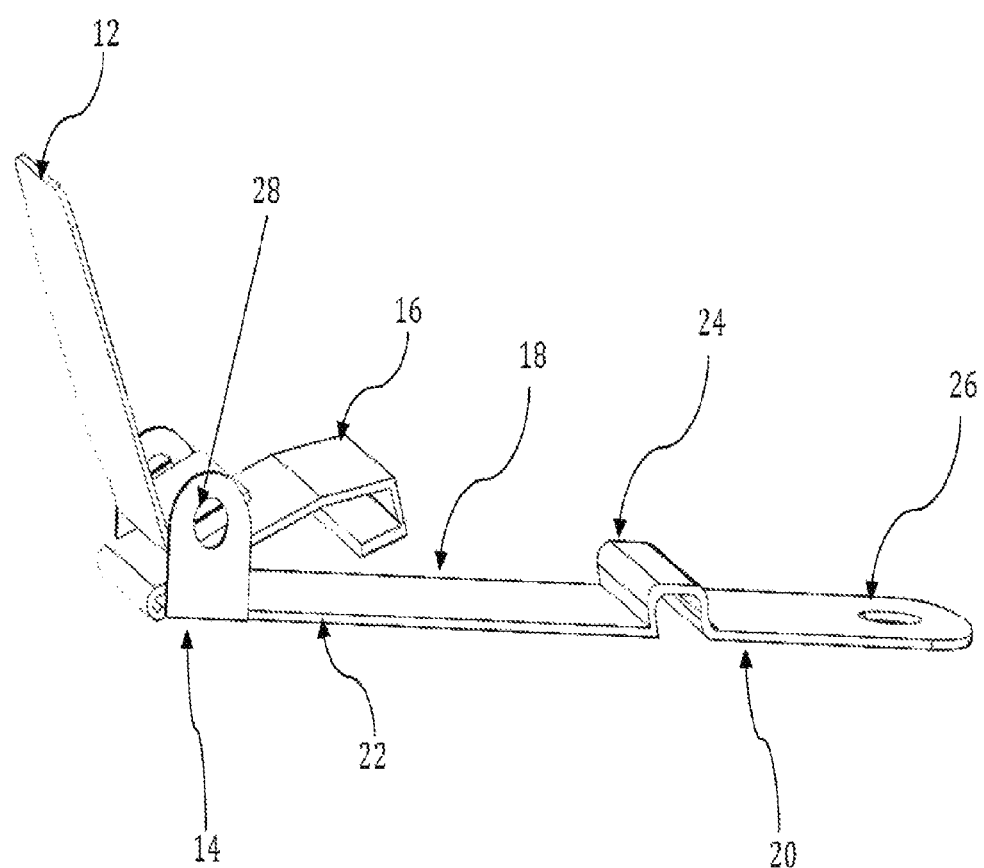
FIG. 1 is an angled assembled side view of a Clamping Retention Clip consistent with, present invention revealing a flap, lower unit, mounting area, overhead flap mounting post, clamping head, base plate, flap mounting post hole, mounting channel and mounting hole.

It is to be understood that this invention is not limited to particular embodiments described, as such may, of course, vary. It is also to be understood that the terminology used herein is for the purpose of describing particular embodiments only, and is not intended to be limiting, since the scope of this invention will be limited only by the appended claims.

The detailed description of the invention is divided into various sections only for the reader's convenience and disclosure found in any section may be combined with that in another section. Unless defined otherwise, all technical terms used herein have the same meaning as commonly understood by one of ordinary skill in the art to which this invention belongs.

It must be noted that as used herein and in the appended claims, the singular forms "a", "an", and "the" include plural referents unless the context clearly dictates otherwise.

The term "about" when used before a numerical designation, e.g., an angle, indicates approximations which may vary by (+) or (−) 10%, 5% or 1%, or any subrange or subvalue there between.

"Comprising" or "comprises" is intended to mean that the Clamping Retention Clip disclosed herein include the recited elements, but not excluding others. "Consisting essentially of" when used to define devices herein, shall mean excluding other elements of any essential significance to the combination for the stated purpose. Thus, a Clamping Retention Clip consisting essentially of the elements as defined herein would not exclude other materials or steps that do not materially affect the basic and novel characteristic(s) of the claimed invention. Embodiments defined by each of these transition terms are within the scope of this invention.

The Clamping Retention Clip has a clamping head that relies on leverage and pressure to produce a higher level of retention. Through the use of the overhead flap and 30 degree angle of the clamping head, the overall viewable area is greatly reduced, making it more discreet and concealable.

Preferably, the Clamping Retention Clip would be constructed using a single piece of metal or plastic to make the lower unit. The lower unit is shaped into the mounting area, clamping head, overhead flap mounting post and base plate. The flap would be constructed separately, and once assembled to the lower unit, it would be able to be rotated manually thus providing leverage and pressure to secure the clamping head.

The present invention will now be more particularly described, with reference to the accompanying drawings, by way of example only and in no way limiting the scope of the invention.

Referring to the drawings, there is shown a Clamping Retention Clip 10 consistent with the present invention which consists of a flap 12, overhead flap mounting post 14, clamping head 16, lower unit 18, mounting area 20, base plate 22, mounting channel 24, mounting hole 26 and flap mounting post hole 28.

The lower unit 18 is not limited to but preferably fashioned out of either metal or plastic and is folded, bent or molded to provide the overhead flap mounting post 14, clamping head 16, mounting area 20, base plate 22, mounting channel 24, mounting hole 26 and flap mounting post hole 28.

The flap 12 is fabricated independently of the lower unit 18. The flap 12 is affixed to the lower unit 18 by way of the overhead flap mounting post 14 and flap mounting post hole 28. The flap 12 is able to be rotated once it is affixed to the overhead flap mounting post 14 of the lower unit 18 via the flap mounting post hole 28.

The base plate 22 is consider to be the area of the lower unit 18 that is directly located under the clamping head 16. The remaining area of the lower unit 18 that extends beyond the clamping head 16 is considered to be the mounting area 20.

The mounting area 20 is shown to have a mounting channel 24 and mounting hole 26, but is not limited to having a mounting channel 24 and mounting hole 26. Depending on the firearm holster, pouch, bag, or knife sheath the mounting area 20 can be molded, bent, folded or drilled to adapt and provide a variety of mounting options.

Figure 2:
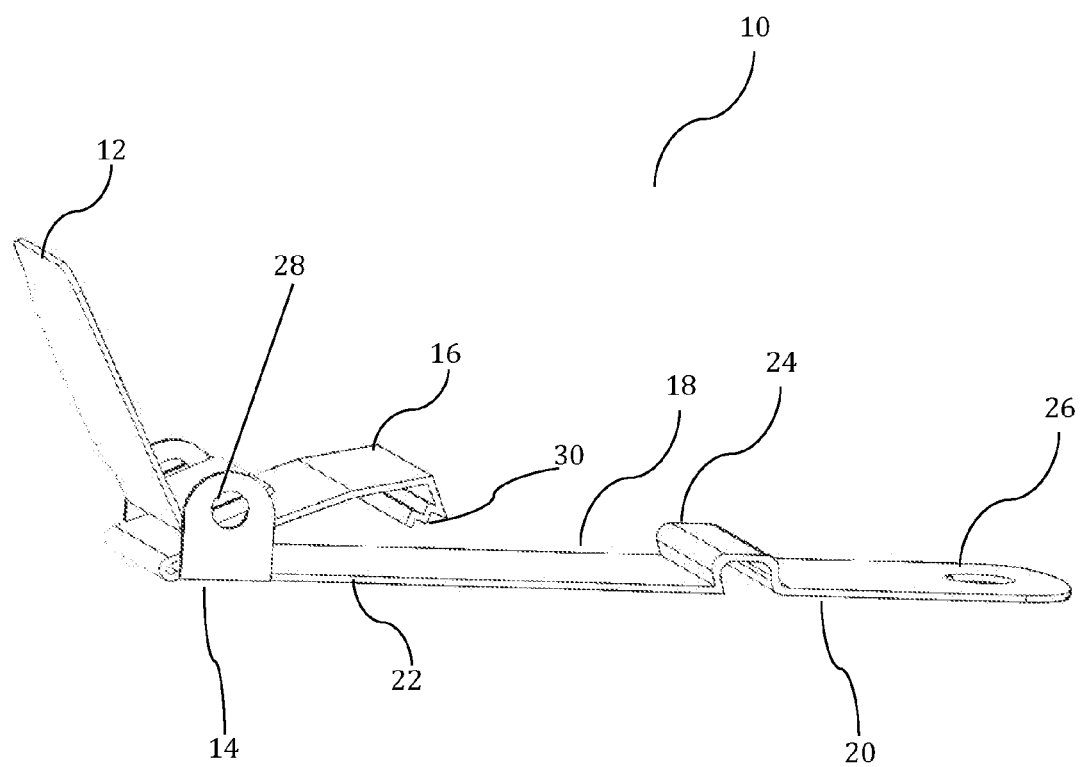
FIG. 2 is an angled assembled side view of a Clamping Retention Clip consistent with the present invention revealing a flap, lower unit, mounting area, overhead flap mounting post, clamping head with corrugated gripping portion, base plate, flap mounting post hole, mounting channel and mounting hole.
Figure 3:
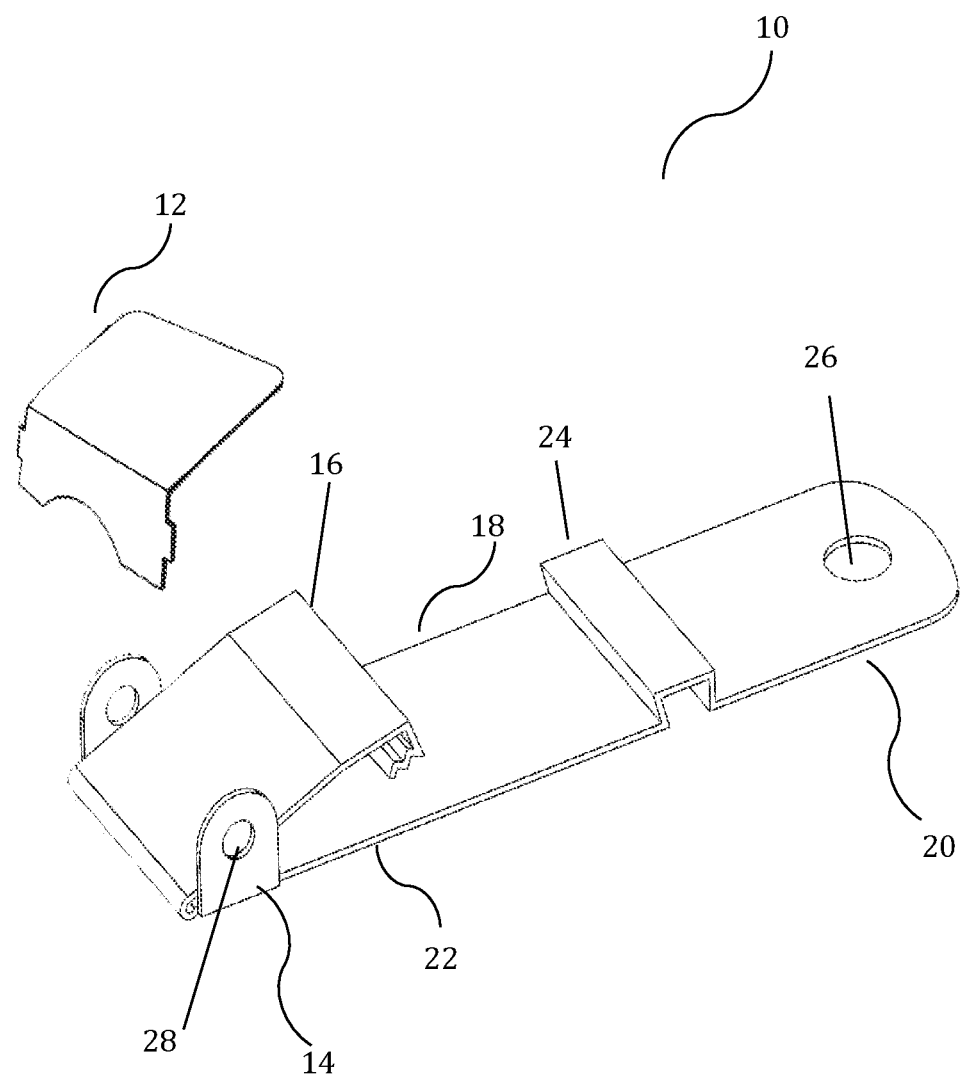
FIG. 3 is an angled disassembled side view of a Clamping Retention Clip consistent with the present invention revealing a flap, lower unit, mounting area, overhead flap mounting post, clamping head, base plate, flap mounting post hole, mounting channel and mounting hole.

FIG. 2 describes another embodiment of a Clamping Retention Clip consistent with the present invention where in the clamping head 16 further comprises a gripping area or portion 30. The gripping area provides additional means for retention of the material engaged with the clip. It is understood the presence of this gripping portion is optional, the gripping area may have a corrugated, raised, patterned or any other non-smooth surface texture suitable for engagement with the material.

The invention will now be described in use with reference to a preferred embodiment. In use, the Clamping Retention Clip is attached to a firearm holster, pouch, bag, or knife sheath to provide better retention and concealability.

Once the Clamping Retention Clip is attached to a holster, bags, pouches, or sheaths it is used much in the same way as a traditional holster, pouch, bag, or sheath clip with the exception of how it provides its retention onto the material where it will be attached.

The Clamping Retention Clip is placed in a location and the clamping head is placed around the desired material when it is in its open state. The Clamping Retention Clip is considered open when the flap is at an angle greater than about 90 degrees from the base plate. Likewise, the Clamping Retention Clip is considered closed when the flap is at an angle of about 10 degrees or less from the base plate.

The Clamping Retention Clip provides its retention when the flap is manually rotated down toward the base plate and applies downward pressure to the clamping head. When the gap between the clamping head and the base plate decreases, the retention capability of the Clamping Retention Clip increases.

Due to the decreased viewable area of the Clamping Retention Clip compared to traditional U-shaped clips, the Clamping Retention Clip provides a much higher level of concealability.

In another embodiment, a two part clip suitable for mounting to a holster, pouch, bag, or sheath and selectively clamping to a material is provided, the clip comprising: a relative lower unit having a mounting area for said holster, pouch, or bag, a base plate, a terminal clamping head comprising a gripping area and configured to receive a material, and a pair of opposing overhead flap mounting posts located at the top of the lower unit adjacent to the clamping head; and a flap having terminal mounting means pivotally attached to the relative lower unit via the mounting openings and configured such that application of a downward pressure on the external surface of the flap rotates the flap toward the base plate of the lower unit and engages and moves the clamping head into a closed position against the base plate and reducing the angle between flap and base plate to maintain position of a material received therein. The mounting area may comprise one or more channel, opening or a combination thereof. The relative lower unit, flap or any area thereof may be metal or plastic. The material is maintained in position between the clamping head and base plate on rotation of the flap to about 10 degrees from the base plate and released by rotation of the flap to above about 90 degrees. The clamping head further comprises an angled portion, wherein the angled portion is angled at about 30 degrees relative to the gripping area. The angle of the gripping area increases clamping strength and is an improvement compared to other clamping devices.

The clip is also configured to enable the flap to be rotated up to about 120 degrees from the base plate. The clip is also configured to enable clamping material having a thickness ranging from 0.001 inches to 0.50 inches. The flap is angled at about 105 degrees in relation to the terminal mounting means. The 120 degree rotating flap combined with the 30 degree angle of the clamping head allows for material with thickness ranging 0.001" to 0.50" to be secured between the base plate and clamping head.

A two part clip kit is also provided comprising the two part clip as described herein, wherein the relative lower unit and the flap are provided separately for assembly by a user prior to mounting of holster, pouch, bag, or knife sheath and receiving a material.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A two part clip suitable for mounting to a holster, pouch, bag, or sheath and selectively clamping to a material, the clip comprising:
    a relative lower unit having a mounting area for said holster, pouch, bag or sheath, a base plate, a terminal clamping head comprising a gripping area and configured to receive a material, and a pair of opposing overhead flap mounting posts located at the top of the lower unit adjacent to the clamping head; and
    a flap having terminal mounting means pivotally attached to the relative lower unit via the mounting openings and configured such that application of a downward pressure on the external surface of the flap rotates the flap toward the base plate of the lower unit and engages and moves the clamping head into a closed position against the base plate and reducing the angle between flap and base plate to maintain position of a material received therein;
    wherein the clamping head further comprises an angled portion that is angled at about 30 degrees relative to the gripping area, and wherein the clip is configured to enable the overhead flap to have about 120 degrees rotation.

2. The clip as recited in claim 1, wherein the mounting area comprises one or more channel, opening or a combination thereof.

3. The clip as recited in claim 1, wherein the relative lower unit, flap or any area thereof is metal or plastic.

4. The clip as recited in claim 1, wherein the material is maintained in position between the clamping head and base plate on rotation of the flap to about 10 degrees from the base plate and released by rotation of the flap to above about 90 degrees.

5. The clip as recited in claim 1, configured to enable clamping material having a thickness ranging from 0.001 inches to 0.50 inches.

6. The clip as recited in claim 5, wherein the flap is angled at about 105 degrees in relation to the terminal mounting means.

7. A two part clip kit comprising the two part clip of claim 1, wherein the relative lower unit and the flap are provided separately for assembly by a user prior to mounting of holster, pouch, bag, or sheath and receiving a material.

\* \* \* \* \*